United States Patent
Yonemura et al.

(10) Patent No.: US 7,322,218 B2
(45) Date of Patent: Jan. 29, 2008

(54) TANK CAP OF FUEL TANK

(75) Inventors: Toshihiro Yonemura, Kakogawa (JP); Hidetaka Kawamura, Akashi (JP); Yu Shibuta, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/471,536

(22) Filed: Jun. 21, 2006

(65) Prior Publication Data

US 2006/0288748 A1    Dec. 28, 2006

(30) Foreign Application Priority Data

Jun. 24, 2005   (JP) ................ P2005-185144

(51) Int. Cl.
*E05B 17/18* (2006.01)
(52) U.S. Cl. ............... 70/162; 70/423; 70/455; 220/210
(58) Field of Classification Search .......... 70/423–428, 70/455, 163, 165–173, 158–162, 164; 220/210
See application file for complete search history.

(56) References Cited

U.S. PATENT DOCUMENTS

| | | | | |
|---|---|---|---|---|
| 1,961,456 A | * | 6/1934 | Rubner | 70/455 |
| 2,096,568 A | * | 10/1937 | Snively | 70/455 |
| 2,355,300 A | * | 8/1944 | Johnstone | 70/455 |
| 2,388,228 A | * | 10/1945 | Johnstone | 70/455 |
| 2,454,925 A | * | 11/1948 | Jacobi | 70/455 |
| 2,681,559 A | * | 6/1954 | Friend | 70/172 |
| 2,696,100 A | * | 12/1954 | Nehls | 70/455 |
| 2,733,831 A | * | 2/1956 | Nehls | 220/302 |
| 4,023,388 A | * | 5/1977 | Morvai | 70/455 |
| 4,154,072 A | * | 5/1979 | Flaschar | 70/455 |
| 4,231,240 A | * | 11/1980 | Fujita et al. | 70/173 |
| 4,665,728 A | * | 5/1987 | Azzara | 70/427 |
| 4,709,567 A | * | 12/1987 | Appelbaum | 70/455 |
| 5,758,529 A | * | 6/1998 | Chhatwal | 70/423 |
| 5,768,921 A | * | 6/1998 | Hill | 70/63 |
| 6,467,316 B1 | * | 10/2002 | Chen | 70/56 |
| 6,675,616 B1 | * | 1/2004 | Horton | 70/337 |

FOREIGN PATENT DOCUMENTS

JP          8-067282          3/1996

* cited by examiner

*Primary Examiner*—Lloyd A. Gall
(74) *Attorney, Agent, or Firm*—Wenderoth, Lind & Ponack, L.L.P.

(57) ABSTRACT

A tank cap for closing a fuel supply port of a fuel tank is provided on its upper surface with a key hole and a cover for covering the key hole. The cover opens and closes the key hole by making the cover swing via a support shaft. Finger catch concave portions are formed at least on both sides of the cover in an axial direction of the support shaft, and each of the finger catch concave portions is structured such that it is possible to insert a finger thereinto and to pinch both side edges in the axial direction of the cover by the inserted finger. Further, a leading end portion of the cover is preferably formed in a tapered shape in plan view.

9 Claims, 6 Drawing Sheets

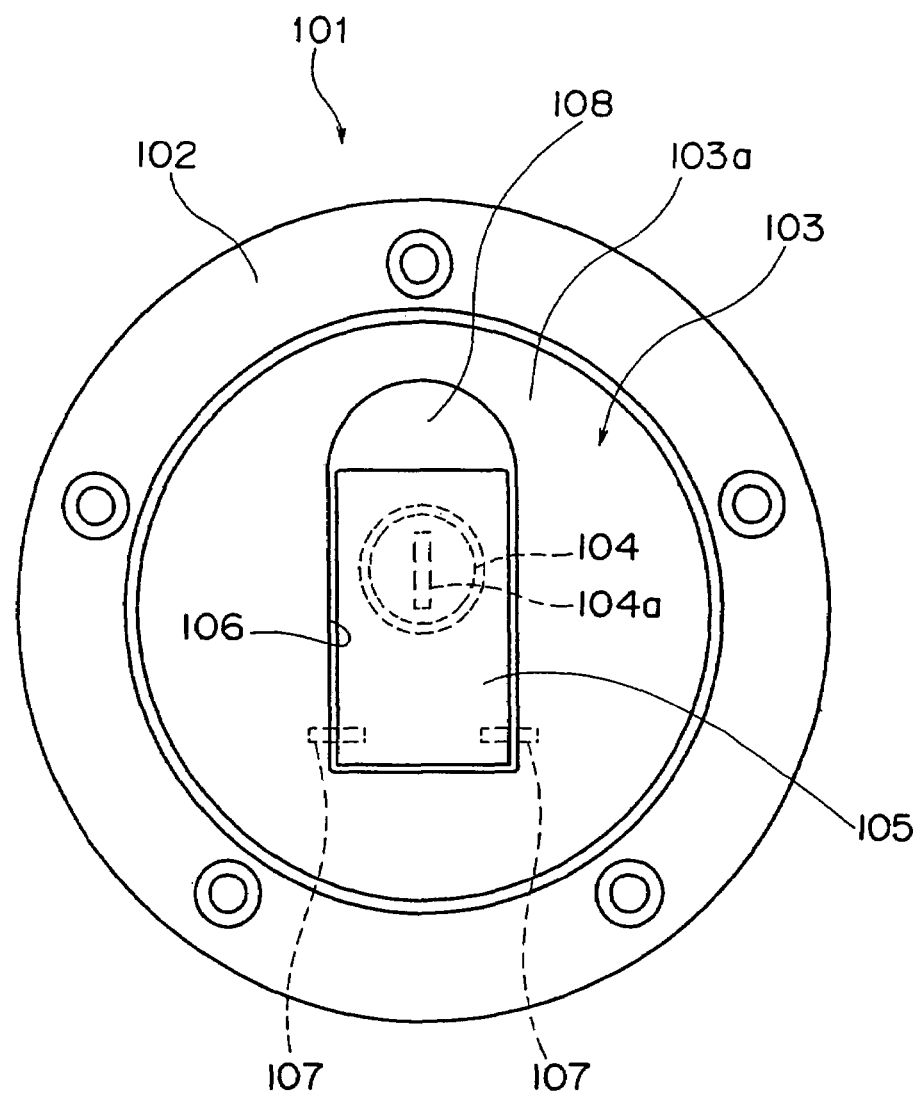
Fig. 7 - PRIOR ART

TANK CAP OF FUEL TANK

BACKGROUND OF THE INVENTION

1. Field of the Invention

The present invention relates to a tank cap of a fuel tank which is mainly applied to a motorcycle, an all terrain vehicle or other vehicle. More particularly, the present invention relates to a tank cap which is suitable for a vehicle in which a fuel supply port of a fuel tank is exposed to an outer side, such as a motorcycle or the like.

2. Description of the Related Art

A fuel tank arranged on an upper side of an engine of a motorcycle and on a front side of a rider seat is generally provided with a fuel supply port on an upper surface, and a tank cap is provided in the fuel supply port so as to be freely opened and closed.

FIG. 7 is a plan view showing a conventional tank cap. A tank cap 101 is provided with a circular ring-shaped base member 102 fixed to an upper surface of a fuel tank, and a cap main body 103 coupled to the base member 102 via a hinge, and the cap main body 103 is provided with a lock device (not shown) locking the tank cap in a closed state, and is provided with a key cylinder 104 for canceling the lock device in accordance with a key operation in a center portion. A key hole 104a is provided on an upper surface of the key cylinder 104, and the key hole 104a is covered by a cover 105.

The key hole 104a of the key cylinder 104 and the cover 105 are arranged within a recess 106 formed on an upper surface 103a of the cap main body 103. In the illustrated example, the rectangular cover 105 is arranged within the rectangular recess 106. The cover 105 is structured such that one end portion in a longitudinal direction is supported via a support shaft 107 so as to freely swing, and can open and close the key hole 104a by making the cover 105 swing. Further, a finger catch concave portion 108 is formed on the upper surface 103a of the cap main body 103 on the other end (a free end) side in a longitudinal direction of the cover 105, and the key hole 104a can be opened by inserting a finger into the finger catch concave portion 108 and catching the finger on the free end of the cover 105 so as to open the cover 105.

Japanese Unexamined Patent Publication No. 8-67282 discloses an example in which the finger catch concave portion is formed on a leading end side of the cover.

In the prior art mentioned above, since only one finger can be inserted into the finger catch concave portion 108 and it is necessary to open the cover 105 by only one finger, it is hard to operate. In particular, in a case where a rider wears riding gloves, it is hard to insert a finger into the finger catch concave portion 108. Even if the finger can be inserted, the finger may not be caught on the cover 105. In the case mentioned above, since it is necessary to take off the riding glove, the process for opening the cover 105 is troublesome. Further, since only a narrow space exists on an upper surface of the cap main body 103, on the free end side of the cover 105, it is impossible to form the finger catch concave portion 108 larger.

SUMMARY OF THE INVENTION

The present invention addresses the above described condition, and an object of the present invention is to provide a tank cap of a fuel tank which can easily open a cover covering a key hole.

In accomplishing this and other objects of the present invention, there is provided a tank cap of a fuel tank for closing a fuel supply port of the fuel tank, the tank cap comprising on an upper surface thereof a key hole and a cover covering the key hole, the cover being capable of opening and closing the key hole by making the cover swing via a support shaft, wherein finger catch concave portions to catch the cover are formed at least on both sides of the cover in an axial direction of the support shaft. Preferably, each of the finger catch concave portions may be structured such that it is possible to insert a finger of an operator thereinto and to pinch both side edges in the axial direction of the cover by the inserted finger.

In accordance with the structure, since the finger catch concave portion is formed on both sides of the cover in the axial direction of the support shaft, it is possible to easily open the cover by pinching both side edges of the cover. Further, since wide spaces exist on the upper surface of the tank cap on both sides of the cover, it is possible to form the finger catch concave portions as large as possible, and it is possible to insert the fingers therein.

Preferably, a leading end portion of the cover may be formed in a tapered shape in a plan view.

In accordance with the structure, since the concave portion can be formed large, it is easy to pinch both side edges of the cover, and it is possible to more easily open the cover.

BRIEF DESCRIPTION OF THE DRAWINGS

This and other objects and features of the present invention will become clear from the following description taken in conjunction with a preferred embodiment thereof with reference to the accompanying drawings.

FIG. 7 is a plan view of a prior art tank cap.

DETAILED DESCRIPTION OF THE PREFERRED EMBODIMENTS

Figure 1:
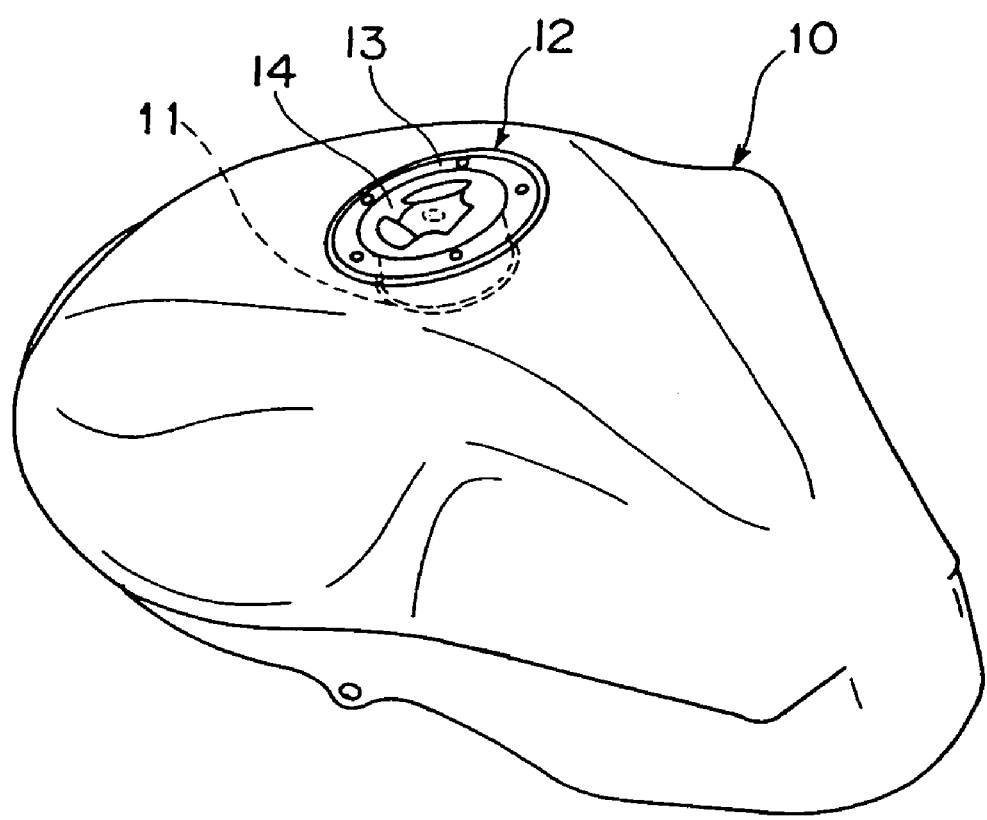
FIG. 1 is a perspective view showing a fuel tank in accordance with an embodiment of the present invention.

FIG. 1 is a perspective view showing a fuel tank of a motorcycle. The fuel tank 10 is arranged on a front side of a rider seat on an upper side of an engine of the motorcycle. On an upper surface of the fuel tank 10, a fuel supply port 11 is formed and a tank cap 12 for closing the fuel supply port 11 is provided. The tank cap 12 is provided with a circular ring-shaped base member 13 fixed to the fuel tank 10, and a cap main body 14 pivoted to the base member 13 so as to freely swing.

Figure 4:
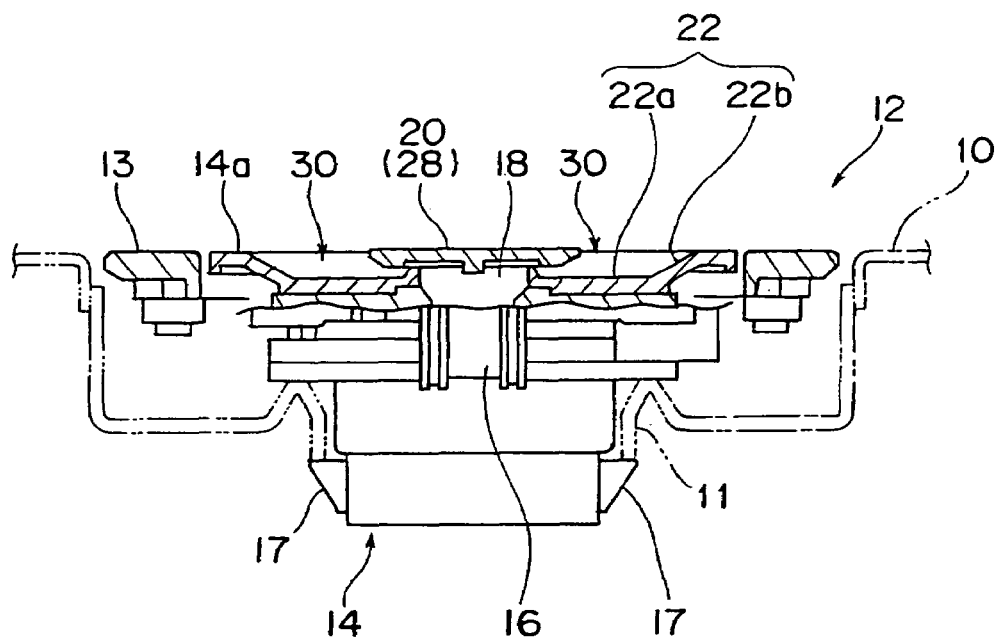
FIG. 4 is a front elevational view (a partly cross sectional view) of the tank cap.
Figure 5:
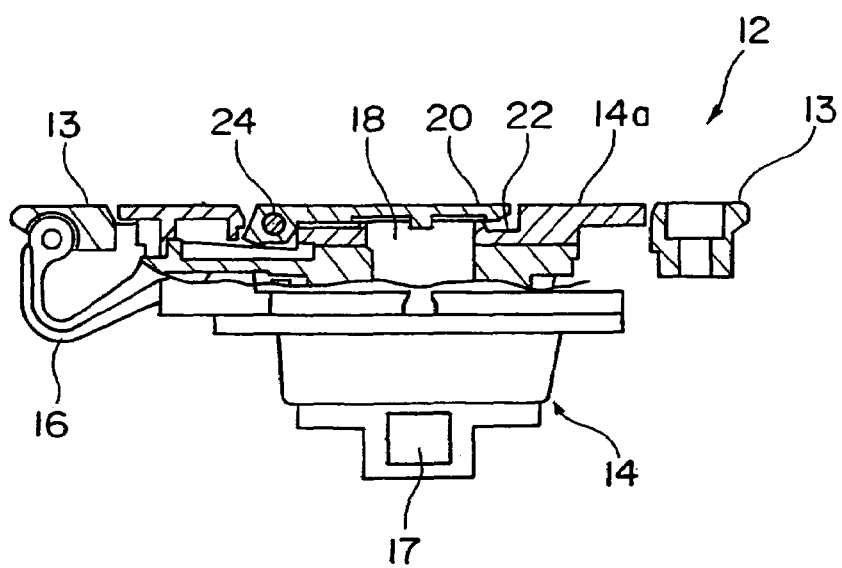
FIG. 5 is a side elevational view (a partly cross sectional view) of the tank cap.

FIG. 4 is a front elevational view (a partly cross sectional view) of the tank cap 12, and FIG. 5 is a side elevational view (a partly cross sectional view) of the tank cap 12. As shown in FIG. 5, the cap main body 14 is pivoted to the base member 13 via a hinge 16 provided on the base member 13 so as to freely swing up and down, and can be opened and closed up and down. A lower portion of the cap main body 14 is provided with a pair of lock pieces 17 which can move forward and backward in a horizontal direction. Each lock piece 17 is structured so as to be engaged with a lower end edge of the fuel supply port 11 by moving forward upon closing of the cap main body 14, thereby holding a closed state.

A key cylinder 18 is provided in an approximately center portion of the cap main body 14, and the key cylinder 18 moves the lock pieces 17 backward by a key operation so as to cancel an engagement (a locked state) with the lower end edge of the fuel supply port 11. A key hole 18a (FIG. 3) is formed on an upper surface of the key cylinder 18, and the key hole 18a is covered by a cover 20.

Figure 2:
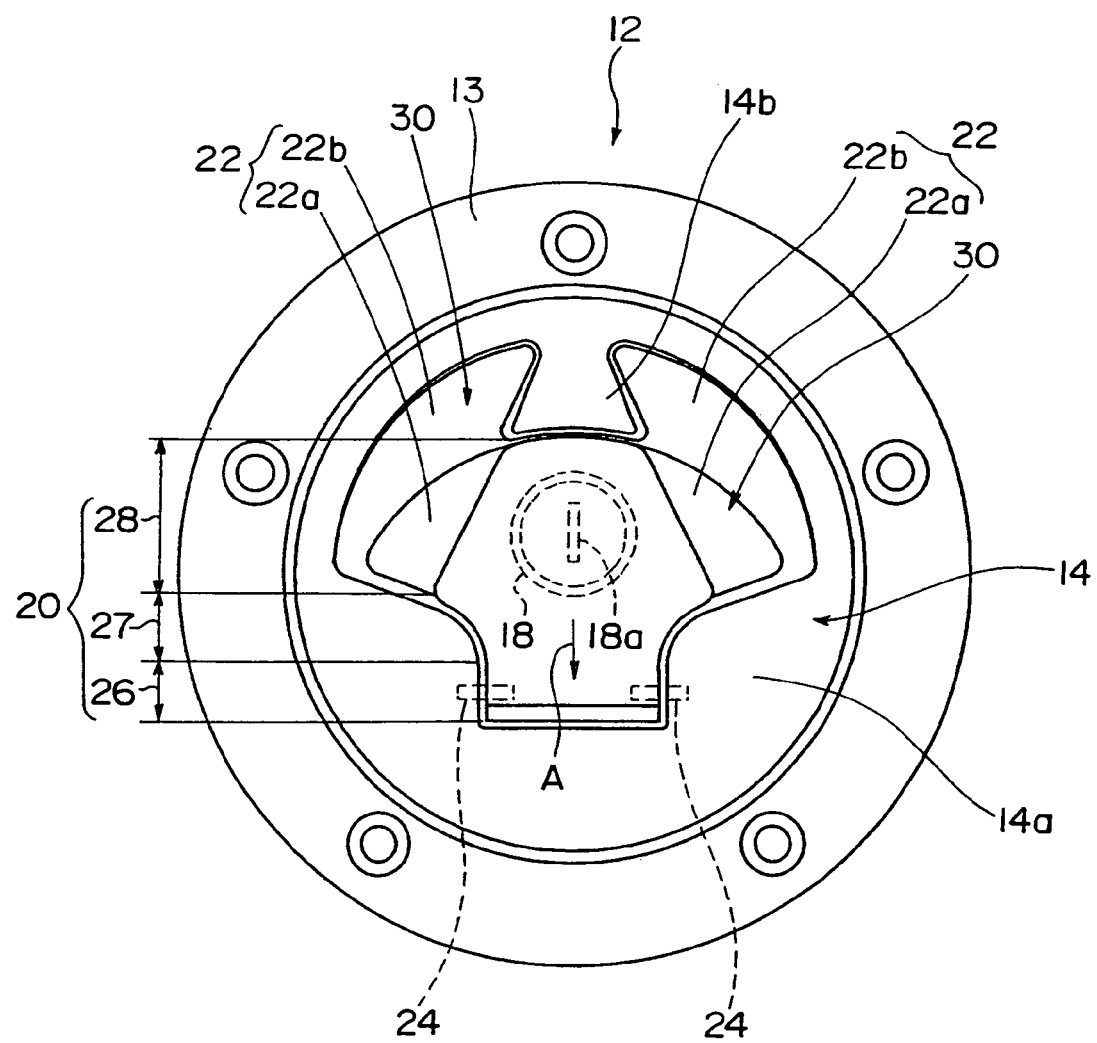
FIG. 2 is a plan view of a tank cap in a state where a cover is closed.
Figure 3:
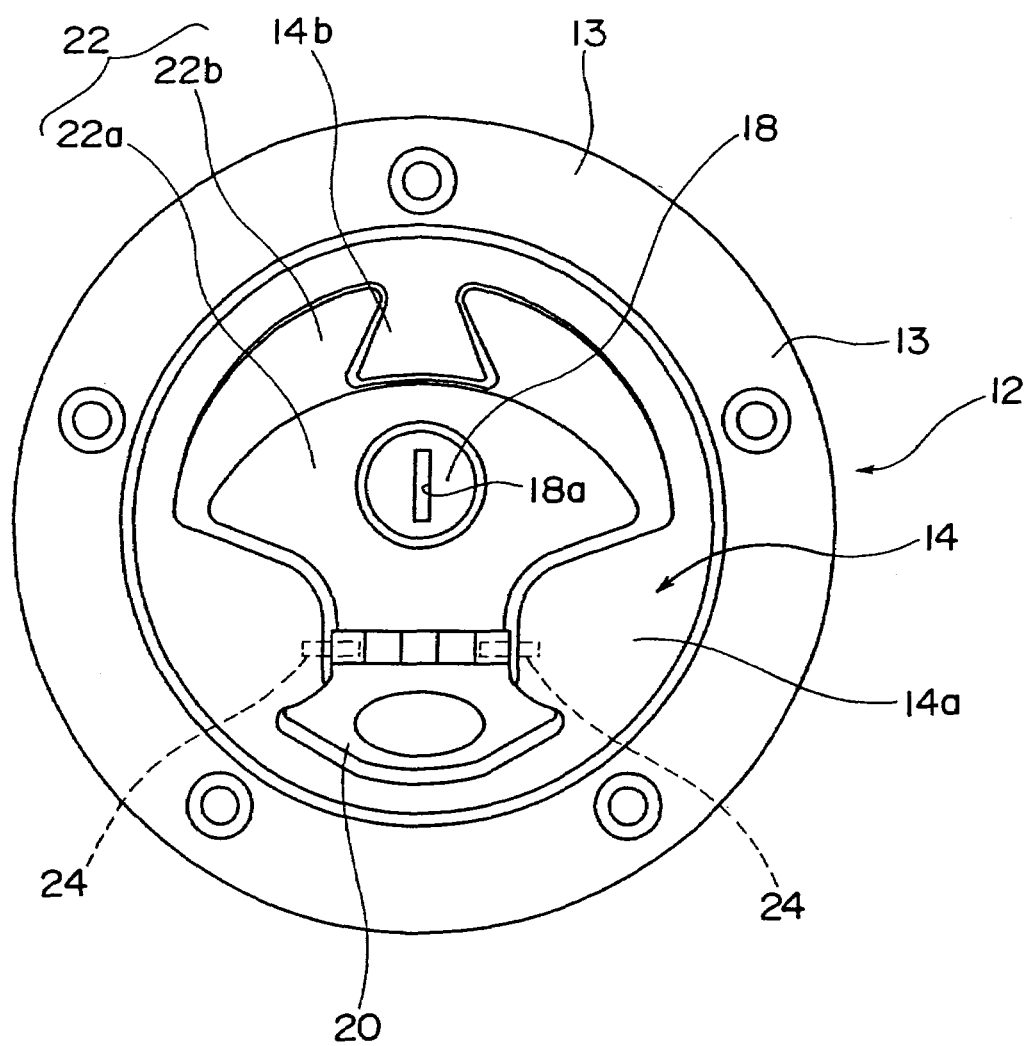
FIG. 3 is a plan view of the tank cap in a state where the cover is open.

FIG. 2 is a plan view of the tank cap 12 in a state where the cover 20 is closed, and FIG. 3 is a plan view of the tank cap 12 in a state where the cover 20 is open. As shown in FIG. 3, the cap main body 14 is formed in a circular shape in a plan view, and a concave portion 22 is formed on the upper surface 14a of the cap main body 14 in a range including the key cylinder 18. The concave portion 22 is formed approximately in a sector shape or a mushroom shape in a plan view.

One end portion of the cover 20 is supported by the cap main body 14 via a support shaft 24 provided on the cap main body 14 in a horizontal direction (a lateral direction) so as to freely swing around the support shaft 24 in a vertical direction. The cover 20 can be swung between a position opening the key hole 18a and a position covering the key hole 18a. The cover 20 is accommodated within the concave portion 22 in a closed state, and an upper surface of the cover 20 is approximately flush with the upper surface 14a of the cap main body 14, as shown in FIGS. 4 and 5.

As shown in FIG. 2, right and left side edges of the cover 20 are in parallel to each other near the support shaft 24, and are sloped in such a manner as to temporarily expand to right and left outer sides toward the free end side, and thereafter narrow a mutual gap toward the free end. In the present embodiment, a portion in which the right and left side edges near the support shaft 24 are in parallel is called a pivot base portion (or a base end portion) 26, a portion in which the right and left side edges are expanded to the right and left outer sides is called an expanded portion (or a middle portion) 27, and a portion which is tapered toward the free end from the expanded portion 27 is called a tapered portion (or a leading end portion) 28. Right and left side edges of the tapered portion 28 are formed in such a manner as to have a tapered cross sectional shape, as shown in FIG. 4. In other words, the lower surface of the cover 20 is sloped upward toward an outer side.

As shown in FIG. 2, near the pivot base portion 26 and the expanded portion 27, the concave portion 22 is formed so as to be along side edges of the pivot base portion 26 and the expanded portion 27 of the closed cover 20, and to be largely widened to the right and left outer sides toward the outer peripheral side of the cap main body 14 from side edges of the tapered portion 28 of the closed cover 20 in the tapered portion 28 side. Therefore, the concave portion 22 is exposed to the upper side even in a state where the cover 20 is closed. It is desirable to set a magnitude of the concave portion 22 to be such that a finger of a person (an operator) supplying fuel into the fuel tank 10 can be inserted and both side edges of the tapered portion 28 can be pinched.

The upper surface 14a of the cap main body 14 is provided with a protruding portion 14b protruding toward the cover 20 in such a manner as to come close to the free end of the closed cover 20. The exposed concave portion 22 is separated into right and left sections by the protruding portion 14b and the closed cover 20. Each of the right and left separated portions 30 are formed as a finger catch concave portion 30 into which a finger is inserted for opening the cover 20.

Further, the concave portion 22 is constituted by a deepest flat bottom surface portion 22a and a slope surface portion 22b in which a depth is gradually reduced from the periphery of the bottom surface portion 22a toward the upper surface 14a of the cap main body 14. The cover 20 is arranged in a range of the bottom surface portion 22a. The slope surface portion 22b is constituted such that a portion arranged on the free end side (the tapered portion 28 side) of the cover 20 is wider than a portion arranged on the base end portion side (the pivot base portion 26 side).

OPERATION AND EFFECT OF THE PRESENT INVENTION (1) In the present embodiment, since the finger catch concave portion 30 is formed on both sides in the lateral direction of the cover 20 (the axial direction of the support shaft 24), it is possible to pinch both the right and left side edges of the cover by two fingers so as to open, for example, by inserting a first finger and a thumb into the respective finger catch concave portions 30. Accordingly, it is possible to easily open the cover 20 in comparison with the prior art shown in FIG. 7.

(2) Since wide spaces exist on the upper surface 14a of the cap main body 14 on both the right and left sides of the cover 20, it is possible to form the finger catch concave portions 30 as large as possible. Accordingly, it may be possible to open the cover 20 even in a state where a rider wears riding gloves.

(3) Since the cover 20 is formed such that the free end side (the tapered portion 28) is tapered in the plan view in FIG. 2, fingers are easily caught on the side edges when pinching the cover 20 from both sides so as to pull up in a direction of an arrow A, whereby it is possible to easily open the cover 20.

(4) Since the cross sectional shape of each of the right and left side edges of the tapered portion 28 of the cover 20 is formed in a tapered shape in which the lower surface is sloped upward, it is possible to easily catch a finger on the side edge.

Figure 6:
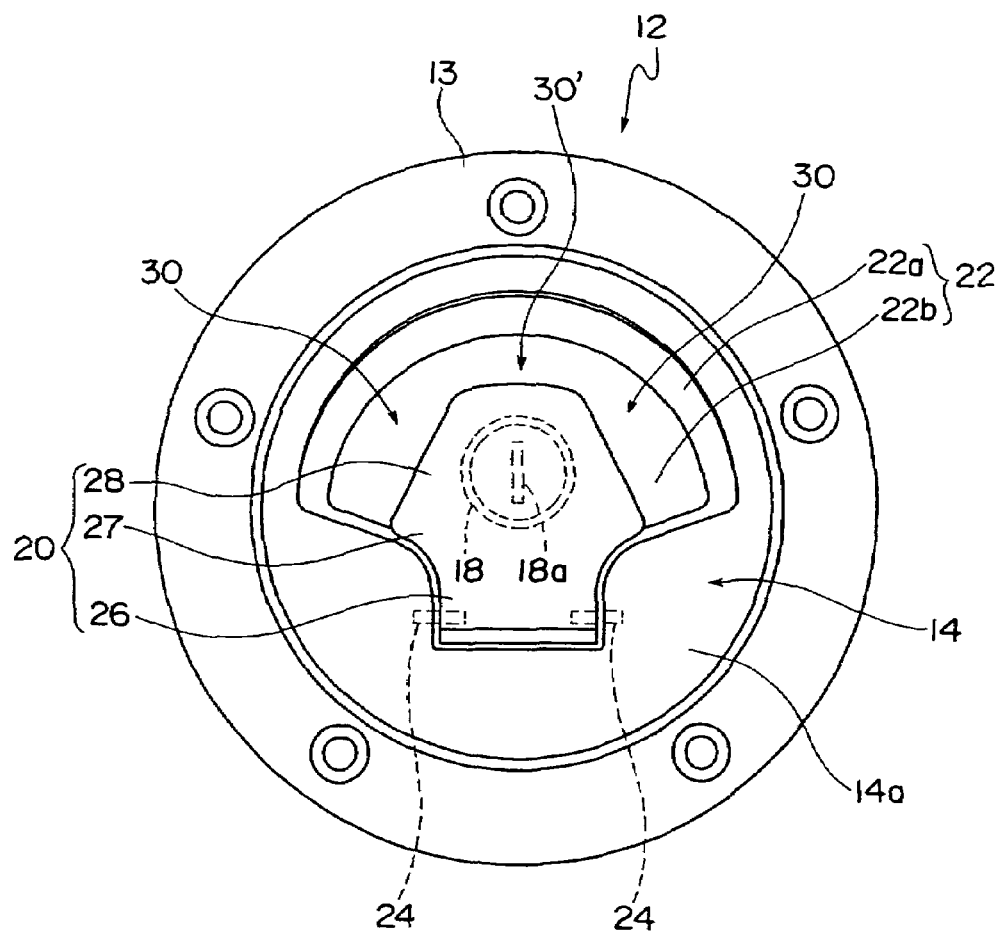
FIG. 6 is a plan view of a tank cap in accordance with another embodiment.

OTHER EMBODIMENTS (1) In the embodiment mentioned above, there is shown the example in which the finger catch concave portion 30 is formed only on both the right and left sides of the cover 20. However, a finger catch concave portion 30' can be also formed on a leading end side of the cover, as shown in FIG. 6. In FIG. 6, the right and left finger catch concave portions 30 and the finger catch concave portion 30' on the leading end side are connected. However, they may be separated via a partition or the like.

(2) The cover 20 is not limited to the tapered shape on the leading end as shown in FIG. 2, but may employ various shapes as far as the finger catch concave portions 30 are formed on both side portions of the cover 20. For example, as shown in the prior art (FIG. 7), the cover 20 may be formed in a rectangular shape in a plan view.

(3) The present invention can be applied to fuel tanks of vehicles other than motorcycles.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A tank cap for closing a fuel supply port of a fuel tank, said tank cap comprising:
    a base member to be fixed to an upper face of the fuel tank;
    a cap main body mounted to said base member by a first pivot hinge so as to be swingable up and down, said cap main body being formed in a circular shape in plan view;
    a key cylinder having a key hole therein and being provided approximately in a center portion of said cap main body for locking said cap main body to said base member;
    a cover mounted to said cap main body via a second pivot hinge to cover said key hole, said second pivot hinge including a support shaft pivotally mounting said cover to said cap main body such that said cover is swingable about said support shaft between a closed position covering said key hole and an open position uncovering said key hole, said support shaft extending in a lateral direction;
    wherein said cap main body includes an upper surface having a concave portion formed therein and facing upward;
    wherein said key cylinder is disposed within said concave portion of said upper surface of said cap main body as viewed in plan view;
    wherein said cover has, when viewed in plan view, a base end portion at which said cover is coupled with said support shaft, a leading end portion opposite said base end portion, and a middle portion located contiguously between said base end portion and said leading end portion, said leading end portion terminating at a free end of said cover;
    wherein said cover has a shape, as viewed in plan view, such that said leading end portion of said cover has a lateral width that is tapered so as to narrow continuously toward said free end from a location at which said leading end portion meets said middle portion;
    wherein said concave portion includes first and second finger catch concave portions into which a finger is to be inserted for swinging said cover from said closed position to said open position; and
    wherein, as viewed in plan view, said first and second finger catch concave portions are disposed at laterally opposite sides of said cover along laterally opposite edges of said leading end portion of said cover so as to be separated by said leading end portion of said cover.

2. A tank cap according to claim 1, wherein
said cover is mounted to said cap main body in such a manner that an upper surface of said cover is approximately flush with said upper surface of said cap main body.

3. A tank cap according to claim 1, wherein
said circular shape of said cap main body includes a circular-shaped outer periphery; and
said concave portion, when viewed in plan view, has an arc-shaped periphery along said circular-shaped outer periphery of said cap main body.

4. A tank cap according to claim 1, wherein
each of said first and second finger catch concave portions, when viewed in plan view, has an arc-shape at a leading edge thereof.

5. A tank cap according to claim 1, wherein
said concave portion further includes a leading-end finger catch concave portion disposed between said first and second finger catch concave portions such that said leading-end finger catch concave portion is disposed at said free end of said cover when said cover is in said closed position.

6. A tank cap according to claim 5, wherein
said first and second finger catch concave portions and said leading-end finger catch concave portion together have an arc-shaped periphery at a leading edge thereof along said circular-shaped outer periphery of said cap main body.

7. A tank cap according to claim 1, wherein
said upper surface of said cap main body includes, when viewed in plan view, a protruding portion protruding toward said free end of said cover.

8. A tank cap according to claim 7, wherein
said protruding portion of said cap main body protrudes in a manner so as to laterally separate said concave portion when viewed in plan view.

9. A tank cap according to claim 1, wherein
said cover has laterally opposite side edges that taper inward and downward when viewed in front cross section.

* * * * *